Dec. 7, 1948.     C. B. LANSING     2,455,423
AUTOMATIC BAND SAW MACHINE
Filed March 14, 1945     2 Sheets-Sheet 2

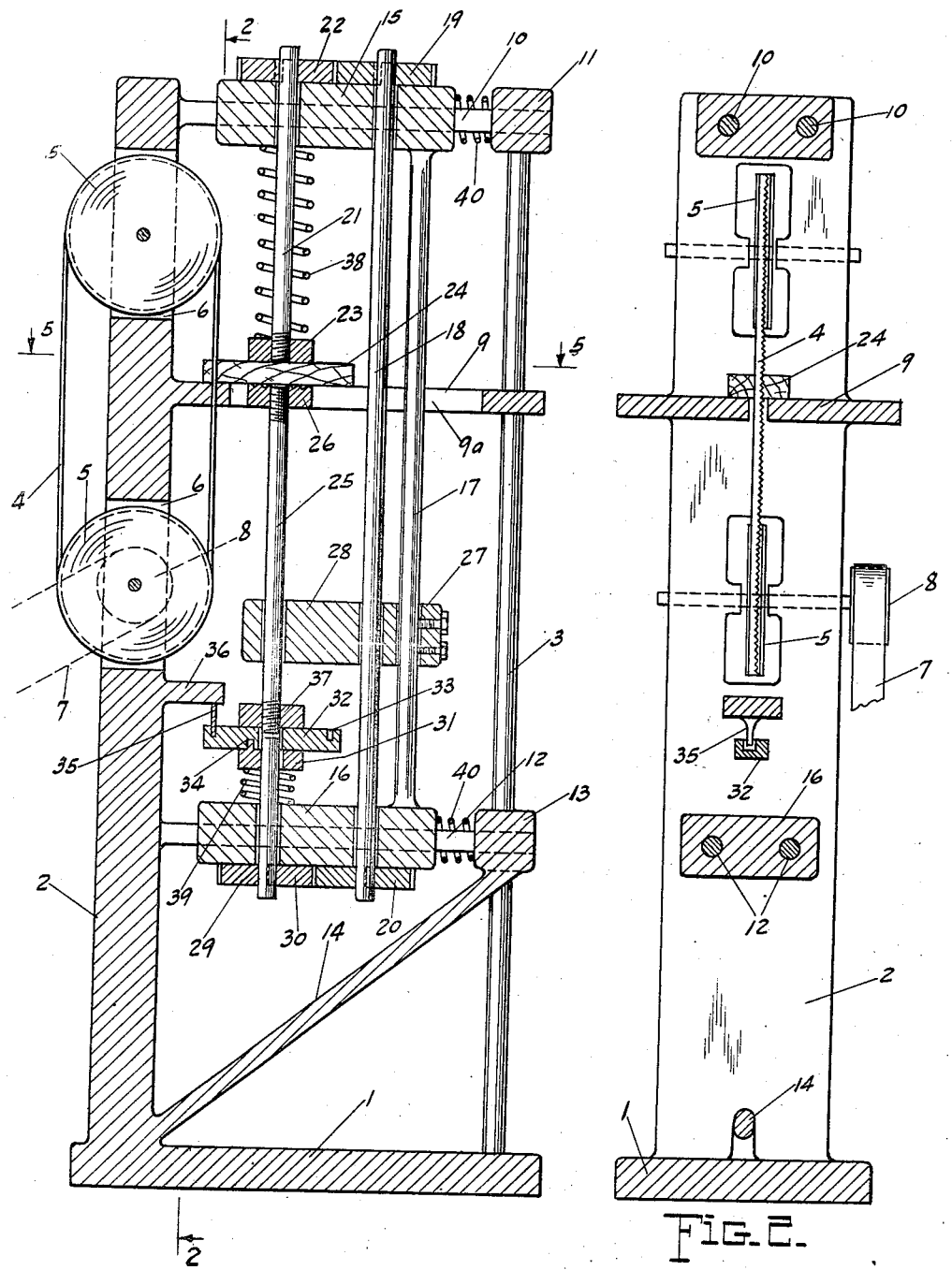

INVENTOR.
C. B. Lansing
BY Robb & Robb
Attorneys

Patented Dec. 7, 1948

2,455,423

UNITED STATES PATENT OFFICE 2,455,423

AUTOMATIC BAND SAW MACHINE

Charles B. Lansing, Geauga County, Ohio

Application March 14, 1945, Serial No. 582,657

9 Claims. (Cl. 144—145)

1

The present invention comprises a novel and improved form of band sawing machine.

The primary object of this invention has been to devise a machine of the above type in which instrumentalities are employed by which, after the band saw has been engaged with the work, the operations of feeding and guiding the saw in relation to the work for cutting the same are performed automatically.

My invention further involves a specific construction of machine of the above type wherein the parts are arranged in a simple and advantageous manner for performing the operations required, in which the work carrier is directed in its movement by a master cam as the guide means for controlling such movement, and wherein the various parts of the machine required for clamping the work and for removably holding in position the master cam guiding means are conveniently disposed and readily operable for the purpose of positioning the work in the machine and for removing the same.

Another improved feature of my invention lies in the provision of a novel form of work carrier mounted for yielding floating movement to shift the work automatically under the control of the master cam.

For a full understanding of this invention and the advantageous operation of the same, reference is to be had to the following detailed description in conjunction with the annexed drawing, in which:

Figure 1 is a vertical longitudinal sectional view of a machine of my invention in one of its preferred forms.

Figure 2 is a vertical transverse sectional view taken about on the line 2—2 of Figure 1.

Figure 4:
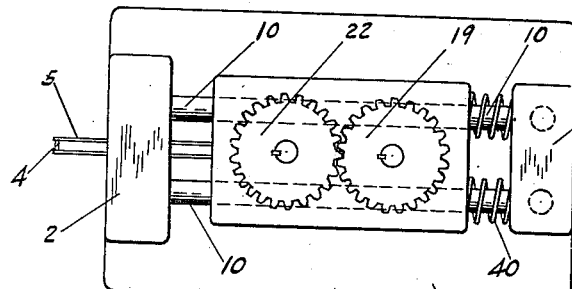
Figure 4 is a top plan view.
Figure 3:
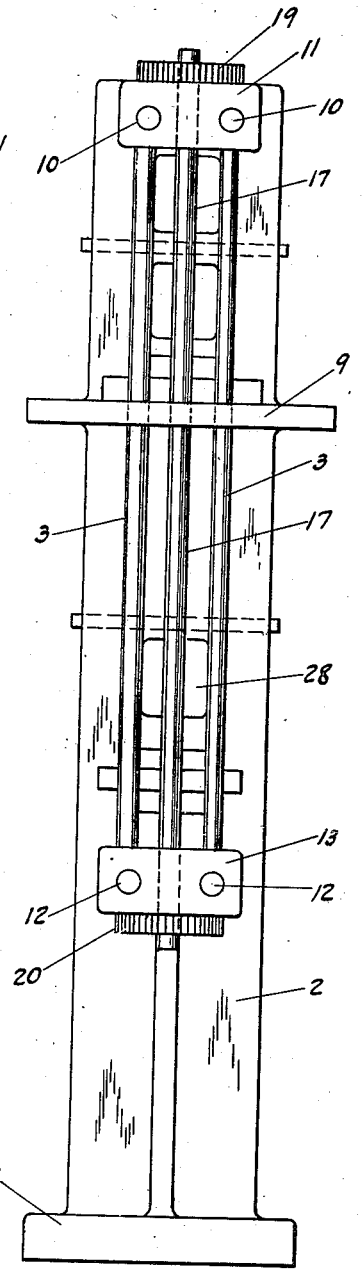
Figure 3 is an end elevational view.
Figure 5:
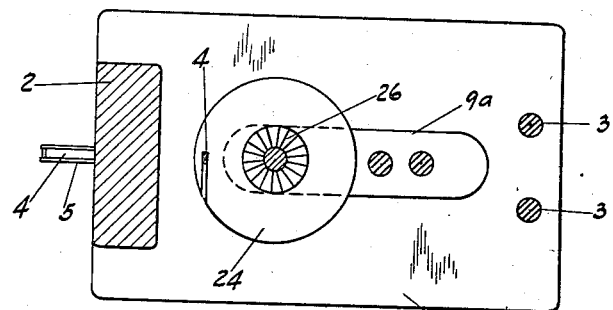
Figure 5 is a horizontal sectional view taken about on the line 5—5 of Figure 1.

Referring to the drawings and describing my construction of machine in detail, it is noted that said machine comprises primarily a frame composed of a base 1, a vertically extending standard 2 near one end of the base, and a relatively narrow vertical supporting bar 3 at the opposite end of the base.

2

As seen in Figure 1 particularly, the band saw 4 may be of any conventional type and is carried by the driving and supporting sheaves or pulleys 5. The pulleys are disposed upon suitable axes and said pulleys are arranged in vertical slotted portions 6 on the standard 2. The saw 4 may be driven by any suitable driving means, and in Figure 1 there is illustrated in dotted lines a drive belt 7 which leads to and around the belt pulley 8, best seen in Figures 1 and 2.

The work table of the machine is designated 9 and is located near the upper portion of the frame of the machine. Said table 9 is flat and may be integrally formed with the standard 2 and the vertical supporting bar of the frame.

At the upper end of the standard 2 there are supported a pair of guide bars 10 which extend from the standard 2 over to and are connected with a transverse head 11 carried by the upper end of the supporting bar 3.

Guide bars 12, similar to the guide bars 10, are located near the lower portion of the machine, spaced above the base 1, and they extend from the standard 2 to a head 13 on the lower portion of the supporting bar 3. The guide bars 12 and the guide bars 10 are in vertical alinement in corresponding planes, and are of substantially the same length in respect to each of said guide bars. An inclined brace member 14 may extend from the lower end of the standard 2 near the base 1 upwardly to the lower head 13 supporting the lower guide bars 12.

In a general way, the parts above described comprise the main frame structure of my machine upon which the band saw 4 is mounted. Carried by the frame structure above described is a movable work, master cam, and guiding carrier frame of the following described construction. The carrier or carrier frame is comprised of an upper transverse head 15 and a lower similar head 16. The upper head 15 is provided with horizontal openings therethrough disposed in spaced relation and which openings receive the upper guide members 10. In a similar manner the lower transverse head 16 of the carrier is provided with spaced openings which in turn receive the lower guide members 12 previously set forth. The upper head 15 and the lower head 16 are connected together by a connecting bar or standard 17 which may be integral with the heads 15 and 16 or rigidly fastened to the latter by any suitable means. An integral construction is disclosed in the drawings, and the parts 15, 16, and 17 may therefore be cast in one if desired.

The carrier frame 15, 16, 17, as above described, supports a driving shaft 18 which extends through the upper head 15 at the upper end of said shaft, and through the lower head 16 at the lower end of said shaft. The driving shaft 18 rotates freely in suitable bearings or openings in the heads 15 and 16, and carries at its upper end a driving gear 19 disposed above the head 15. At its lower end the shaft 18 carries a transmitting gear 20 and the gears 19 and 20 are keyed to the shaft 15.

Associated with the shaft 18 on the carrier are work and master cam holding and operating shaft members which are virtually a sectional shaft. These shaft members, as seen best in Figure 1, include the upper shaft member 21, to the upper end of which is keyed a driving gear 22 meshing with the driving gear 19. At its upper end the shaft member 21 is mounted for rotation in the head 15, and carries at its lower end a work clamping head 23. The head 23 may be screwed upon the lower end of the shaft 21 or otherwise adjustably or rigidly fastened to said shaft member 21, in such a way as to readily engage the work 24 which is disposed above the table 9.

Beneath the shaft 21 and in alinement therewith is a middle shaft member 25 of the sectional shaft assembly now being described, and said shaft member 25 has at its upper end a lower work engaging and clamping head 26. If desired, the upper surface of the head 26 may be roughened, toothed, or serrated in order to positively engage or grip the under side of the work 24 disposed above the table 9. The table 9 is provided with a slot 9a longitudinally thereof, of a size in which the head 26 may readily slide by free movement along the table 9.

The connecting bars 17 between the heads 15 and 16 has attached thereto, as by means of screws 27, a movable guiding head or member 28, provided with openings, in one of which is received the shaft 18 at a point intermediate the ends of the latter, and in the other of which the shaft member 25 is received intermediate its ends. The supporting and guiding head 28 may be adjusted vertically and maintains the shaft 25 primarily in proper operating position in relation to the upper shaft member 21 alined therewith and in relation to a lowermost shaft member 29 which is mounted in the lower guiding head 16. The shaft member 29 is provided at its lower end with a driving gear 30 which meshes with the gear 20 previously mentioned as carried by the shaft 18 at its lower end. At its upper end the shaft member 29 carries a master cam engaging head 31 keyed thereto and adapted to support thereon the master cam 32 which is provided with a groove 33 designed to perform a guiding function for the work during the operation of the saw upon the work. If desired, the head 31 for the master cam 32 may be provided with a lug or pin 34 for positioning the cam 32 properly in relation to the shaft 29, and the guide groove 33 of the cam 32 is arranged to be interengaged by a guide finger 35 which projects downwardly from an arm 36 extending inwardly from the standard 2 just below the band saw 4. The holding in position of the cam 32 by means of the lower head 31 is facilitated by means of a clamping head 37 carried by the lower end of the shaft member 25, it being noted that the various shaft members 21, 25, and 29 are all vertically alined. The head 37 may be screwed upon the lower end of the member 25 and its clamping effect thus varied as required, in relation to the master cam 32.

For assisting in the clamping action of the heads 23 and 26 on the work 24, the shaft member 21 is mounted for slight vertical movement in the head 15, but is normally held downward with clamping effect by means of a coil spring 38 interposed between the head 15 and the work holding head 23.

A somewhat similar arrangement is provided at the lower end shaft member 29 which is also slightly movable longitudinally in a downward direction in order to release the cam 32 from the heads 31 and 37. By a spring 39 encircling the shaft 29 and bearing at its lower end on the guide heads 16 and at its upper end against the under side of the head 31, the head 31 is normally pushed upwardly into clamping engagement with the master cam 32.

It will be seen from the arrangement of the parts thus far described that the upper and lower guiding heads 15 and 16, respectively, are arranged for transverse sliding movement upon the guide members 10 and 12, respectively. In other words, the carrier which has been described, for the work and the master cam, has a somewhat floating mounting in that it can move horizontally toward and from the saw 4, which movement will be compelled by the guide finger 35 operating in the groove 33 of the master cam 32. However, the carrier is normally forced in the direction of the saw 4 by means of coil springs 40 which encircle the guide members 10 and 12 and are interposed between the head 11 and the guiding head 15 in respect to the upper springs 40, and between the lower head 13 and the lower guiding head 16 in respect to the lower springs 40.

Figure 6:
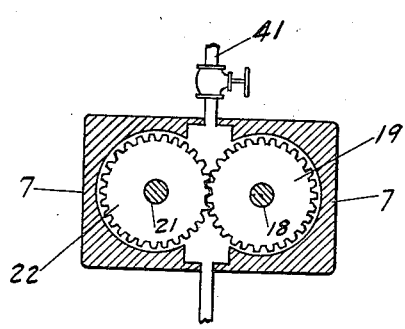
Figure 6 is a sectional view of an oil gear unit which may be employed for driving the work and master cam operating shaft mounted upon the movable carrier supporting the same.
Figure 7:
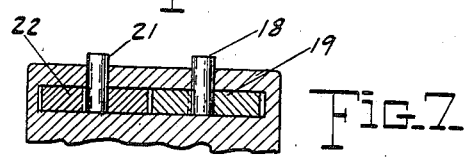
Figure 7 is a fragmentary sectional view of the oil gear unit taken about on the line 7—7 of Figure 6.

So far as the operation of driving the shafts 21, 25, 29, and 18 is concerned, I may utilize at the upper end of the machine, above the guiding head 15, an oil gear unit such as shown in Figure 6 of my drawings, and also in Figure 7. When such a gear unit is used, of course the inlet conduit for the oil under pressure, designated 41, will be flexible in order to accommodate for the shifting movement in a lateral or horizontal direction of the carrier mounted on the machine and movable in relation to the saw 4.

Or, if desired, I may use for driving the said shafts, a driving connection from any suitable source running to either one of the gears 19 and 22, it being understood, of course, that the connection involved for driving such gear would be flexible to accommodate for the horizontal floating movement of the carrier for the work and the master cam.

The operation of my machine as above described will now be set forth. The pattern upon which the work 24 is to be cut having been determined, the proper controlling master cam 32 is placed in position on the shaft 29 by moving the shaft downwardly against the expansive action of the spring 39. After positioning the master cam 32 the work 24 is emplaced in position between the heads 23 and 26 by raising of the shaft 21 a slight distance against the action of the spring 38, and thereafter permitting the parts 33 and 26 to clamp the work. During the above adjustments of the machine with the master cam and work in position, the carrier supporting the driving shafts will be pulled away from the band saw 4, or the saw will be discontinued from operation. Thereupon, the work being ready to be cut, the carrier is permitted to operate under the action of the pushing springs 40 and the drive on the shaft 18, 21, 25, and 29 is started so that from that time on the master cam 32 will control the movement of the work 24 in relation to the saw 4 according to the master pattern of the groove 33 in the cam 32, under the guiding action of the guide finger 35 that operates in the groove 33.

With my machine the operation of cutting the work to a master pattern is entirely performed in a substantially automatic manner without need for feeding and guiding the work by hand. In the operation of my machine, the work 24 is in part supported or stabilized by being carried on the table 9, and the downward movement of the shaft members 21, 25, and 29 is limited in this manner in so far as the effect of the upper spring 38 is concerned, the lower spring 39 assisting in such action.

The guide member 35 may operate on an edge controlling contour of the cam 32 instead of in the groove 33, as self-evident. Also, the member 35 is in vertical alinement with the inner cutting lap of the saw 4 for proper cutting action on the work.

Having thus described my invention, what I claim as new and desire to secure by Letters Patent of the United States is:

1. In a band saw machine, in combination, a supporting frame, a vertically disposed band saw mounted on the frame, a carrier carried by the frame and comprising an upper head and a lower head, horizontal guide members on the frame and engaging the said heads, means intermediate the carrier and frame normally urging the carrier to move in the direction of the saw, a vertical driving shaft mounted on and movable with the carrier, master cam and work holding complemental shaft means parallel to the driving shaft and supported to move with the carrier, a driving connection between the driving shaft and the complemental shaft means and a work guide member on the frame coacting with the master cam to move the complemental shaft means toward and from the saw during rotation of said last shaft means.

2. A machine as claimed in claim 1, in which the urging means includes springs supported between the frame and the upper and lower heads.

3. A machine as claimed in claim 1, in which the urging means includes coiled springs encircling the guide members and bearing at one end against the upper and lower heads, and at the opposite end against the frame.

4. A machine as claimed in claim 1, in which the complemental shaft means comprises sectional shaft members cooperating to clamp the master cam in position interengaging the work guide member, and also clamping the work in operative relation to the saw.

5. A machine as claimed in claim 1, in which the complemental shaft means comprises sectional shaft members cooperating to clamp the master cam in position interengaging the work guide member, and also clamping the work in operative relation to the saw, the sectional shaft members being alined and superposed, combined with means resiliently holding the said sectional shaft members together for driven rotation.

6. A machine as claimed in claim 1, in which the complemental shaft means comprises sectional shaft members cooperating to clamp the master cam in position interengaging the work guide member, and also clamping the work in operative relation to the saw, the sectional shaft members being alined and superposed, combined with means resiliently holding the said sectional shaft members together for driven rotation and the resilient holding means comprising springs yieldable to enable separation of the sectional shaft members for inserting and removing the work and master cam engaged thereby.

7. A machine as claimed in claim 1, in which the complemental shaft means comprises sectional shaft members cooperating to clamp the master cam in position interengaging the work guide member, and also clamping the work in operative relation to the saw, the sectional shaft members being alined and superposed, combined with means resiliently holding the said sectional shaft members together for driven rotation and the resilient holding means comprising springs encircling certain of the sectional shaft members, one intermediate the upper head and work, and the other intermediate the lower head and master cam.

8. In a band saw machine, in combination, a supporting frame, a band saw mounted thereon, a work supporting carrier mounted for floating horizontal movement on the frame, a work clamp on the carrier, a master guide cam removably mounted on the carrier, common means cooperating to hold the work clamp operative and the master cam clamped in position, a guide finger on the frame to engage the cam, means normally causing a floating movement of the carrier toward the saw under control of the master cam, and means to simultaneously actuate the cam and work clamp, said common means including three superposed alined shaft members combined to support the work clamp and master cam in alinement, the work clamp being engaged between upper and middle shaft members, and the master cam between the middle and lower shaft members, and spring means on the upper and lower shaft members for effecting said clamping actions.

9. In a band saw machine, in combination, a supporting frame, a band saw mounted thereon, a work supporting carrier mounted for floating horizontal movement on the frame, a work clamp on the carrier, a master guide cam removably mounted on the carrier, common means cooperating to hold the work clamp operative and the master cam clamped in positions, a guide finger on the frame to engage the cam, means normally causing a floating movement of the carrier toward the saw under control of the master cam, and means to simultaneously actuate the cam and work clamp, said common means including three superposed alined shaft members to support the work clamp and master cam in alinement, the work clamp being engaged between upper and middle shaft members, and the master cam between the middle and lower shaft members, and springs for pushing the three shaft members end to end together.

CHARLES B. LANSING.

REFERENCES CITED

The following references are of record in the file of this patent:

UNITED STATES PATENTS

| Number | Name | Date |
|---|---|---|
| 397,888 | Barras | Feb. 19, 1889 |
| 860,486 | King | July 16, 1907 |
| 899,356 | Trevor | Sept. 22, 1908 |
| 948,784 | Kramer et al. | Feb. 8, 1910 |
| 1,272,474 | Long | July 16, 1918 |

FOREIGN PATENTS

| Number | Country | Date |
|---|---|---|
| 197,669 | Great Britain | Jan. 10, 1924 |